(12) United States Patent
Kobayashi et al.

(10) Patent No.: US 8,806,880 B2
(45) Date of Patent: Aug. 19, 2014

(54) EXPANSION VALVE

(75) Inventors: Kazuto Kobayashi, Tokyo (JP); Takashi Mogi, Tokyo (JP); Eiji Fukuda, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 954 days.

(21) Appl. No.: 12/680,991

(22) PCT Filed: Sep. 18, 2008

(86) PCT No.: PCT/JP2008/066836
§ 371 (c)(1),
(2), (4) Date: Mar. 31, 2010

(87) PCT Pub. No.: WO2009/054211
PCT Pub. Date: Apr. 30, 2009

(65) Prior Publication Data
US 2010/0237270 A1     Sep. 23, 2010

(30) Foreign Application Priority Data

Oct. 24, 2007    (JP) .................................. 2007-276698

(51) Int. Cl.
*F25B 41/06*    (2006.01)
(52) U.S. Cl.
USPC .......................................................... 62/236
(58) Field of Classification Search
USPC ...................................................... 236/92 B
See application file for complete search history.

(56) References Cited

U.S. PATENT DOCUMENTS

| | | | | | |
|---|---|---|---|---|---|
| 5,996,899 | A | * | 12/1999 | Watanabe et al. | 236/92 B |
| 6,012,301 | A | * | 1/2000 | Fujimoto et al. | 62/225 |
| 6,062,484 | A | * | 5/2000 | Eybergen | 236/92 B |
| 6,112,998 | A | * | 9/2000 | Taguchi | 236/92 B |
| 6,145,753 | A | * | 11/2000 | Yano et al. | 236/92 B |
| 6,354,509 | B1 | | 3/2002 | Fukuda et al. | |
| 2002/0185545 | A1 | * | 12/2002 | Kobayashi et al. | 236/92 B |
| 2007/0131823 | A1 | * | 6/2007 | Mominee et al. | 248/62 |

FOREIGN PATENT DOCUMENTS

| JP | 09-026235 | * | 1/1997 | |
|---|---|---|---|---|
| JP | 09-062235 | * | 1/1997 | F25B 41/06 |
| JP | 11-182982 | | 7/1999 | |
| JP | 2000-304381 | | 11/2000 | |

(Continued)

*Primary Examiner* — Alexandra Elve
*Assistant Examiner* — Henry Crenshaw
(74) *Attorney, Agent, or Firm* — Fildes & Outland, P.C.

(57) ABSTRACT

An expansion valve for reducing the quantity of material required for the valve body by contriving the arrangement of bolt fitting grooves. In the expansion valve (20), displacement of a valve member driver (36) provided in the valve body (21) is transmitted to a valve member by a valve member drive rod (36f) and the valve opening is altered to control the flow rate of the refrigerant. The valve body (21) consists of a body upper portion (40) and a body lower portion (41) narrower than the body upper portion (40), and bolt fitting grooves (43, 43) opening in the flank of the valve body (21), preferably opening obliquely downward, are formed at the boundary (42) of the body upper portion (40) and the body lower portion (41). With such a layout, the material required at the boundary (42) can be reduced furthermore and the quantity of material required for the valve body (21) can be reduced furthermore, as a result. Since the opening width (minimum spatial dimension) w is smaller than the diameter of bolt, a seating surface is assured sufficiently around the bolt fitting groove (43) and the bolt does not drop off from the bolt fitting groove (43).

1 Claim, 12 Drawing Sheets

(56) References Cited

FOREIGN PATENT DOCUMENTS

| JP | 2001-199230 | 7/2001 | | |
| JP | 2003-307372 | 10/2003 | | |
| JP | 3545847 | 7/2004 | | |
| JP | 2006-132881 | 5/2006 | | |
| JP | 2006132881 | * | 5/2006 | ............. F25B 41/06 |
| JP | 2006132881 A | * | 5/2006 | |

* cited by examiner

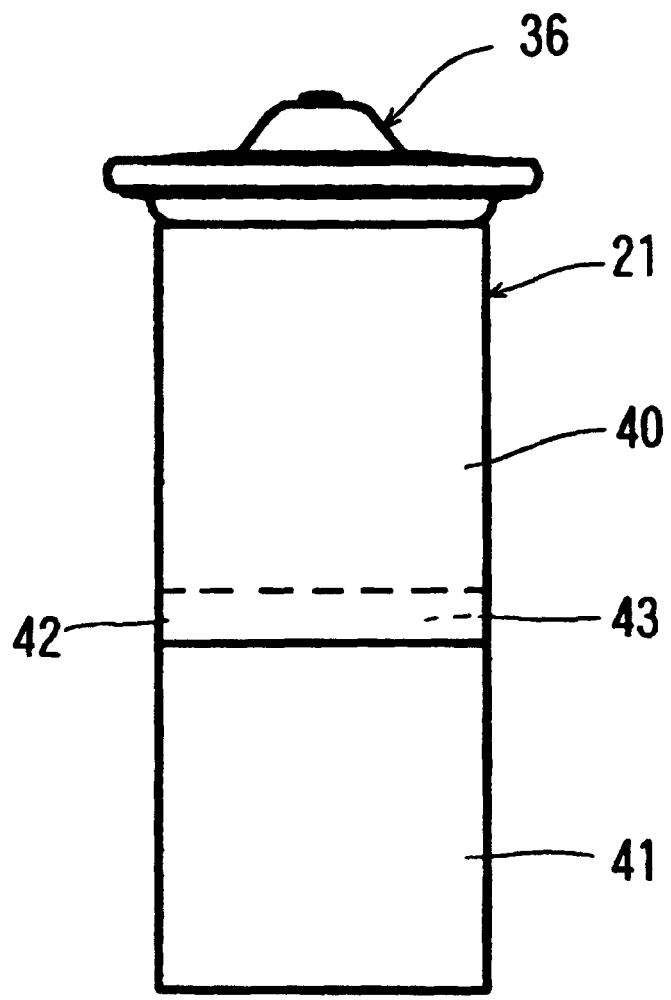

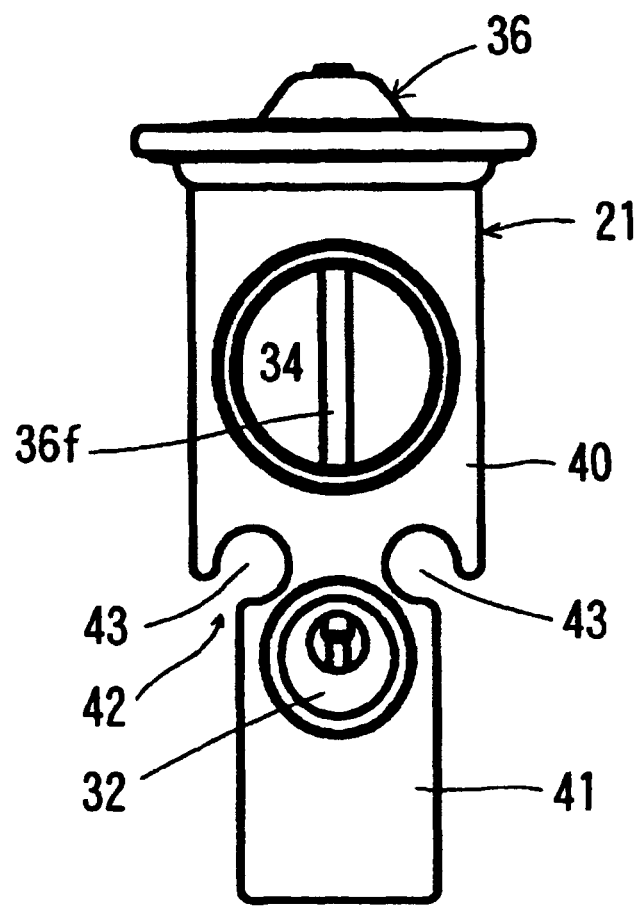

EXPANSION VALVE

TECHNICAL FIELD

The present invention relates to expansion valves applied to refrigeration systems used for example in air conditioning devices.

BACKGROUND ART

One example of a refrigeration cycle of a prior art air conditioning device is illustrated in FIG. 5. In the refrigeration cycle 1 illustrated in FIG. 5, refrigerant compressed via a compressor 4 driven by a drive source 2 such as a motor is sent to a condenser 5, and air is blown from a fan 12 toward the condenser 5, by which the refrigerant is liquefied. The refrigerant liquefied in the condenser 5 is stored in a receiver 6, the liquid refrigerant from the receiver 6 passes through an expansion valve 10 for controlling the amount of refrigerant passing therethrough to be sent to an evaporator 8, and the refrigerant vaporized in the evaporator 8 is returned to the compressor 4, by which a refrigeration cycle is formed. The expansion valve 10 has a temperature sensor 10a for sensing the refrigerant temperature at the outlet side of the evaporator 8 and a pressure equalizing pipe arrangement 10b for a diaphragm disposed in the expansion valve 10, wherein these values are sent to the expansion valve 10 as feedback, based on which the valve opening is controlled.

FIG. 6 is a vertical cross-sectional view showing an outline of an example of the expansion valve used in the refrigerant cycle illustrated in FIG. 5. The valve body 30 of the expansion valve 10 includes a first passage 32 for introducing gas-liquid two-phase refrigerant formed at a portion between the refrigerant outlet of the condenser 5 and the area headed via the receiver 6 toward the refrigerant inlet of the evaporator 8, and a second passage 34 formed at a portion between the refrigerant outlet of the evaporator 8 and the area headed toward the refrigerant inlet of the compressor 4, which are disposed in a vertically spaced-apart manner constituting a refrigerant pipe line 11 of the refrigeration cycle. The first passage 32 includes a valve hole 32a for decompressing the liquid-phase refrigerant supplied from the refrigerant outlet of the receiver 6 formed along a center line in the longitudinal direction of the valve body 30. A valve seat is formed at the inlet of the valve hole 32a, and the valve member 32b is biased via a biasing means 32c such as a compression coil spring toward the valve seat.

The expansion valve 10 includes an inlet port 321 and a valve chamber 35 communicated with the inlet port 321. The valve chamber 35 is a chamber having a bottom formed coaxially with the center line of the valve hole 32a, which is airtightly sealed via a plug 37. The second passage 34 has ports 341 and 342 connected to the refrigerant pipe line 11.

A valve member driver 36 for driving the valve member 32b is attached to the upper end of the valve body 30. The valve member driver 36 comprises a pressure operation housing 36d having the inner space thereof divided into upper-sectioned and lower-sectioned pressure operation chambers 36b and 36c via a diaphragm 36a. The lower-sectioned pressure operation chamber 36c within the pressure operation housing 36d is communicated with the second passage 34 via a pressure equalizing hole 36e formed concentrically with the center line of the valve hole 32a, so the pressure of the refrigerant vapor within the second passage 34 is loaded on the lower-sectioned pressure operation chamber 36c.

The pressure equalizing hole 36e has a valve member drive rod 36f concentrically arranged therein, extending from the lower side of the diaphragm 36a to the valve hole 32a of the first passage 32. The valve member drive rod 36f is supported in a vertically slidable manner on a partition wall separating the first and second passages 32 and 34 of the valve body 30, and the lower end thereof is in contact with the valve member 32b. A sealing member 36g for preventing leakage of the refrigerant between the passages 32 and 34 is attached to the outer circumference of the valve member drive rod 36f capable of moving in sliding motion with respect to the partition wall.

A known diaphragm drive fluid is filled in the upper-sectioned pressure operation chamber 36b of the pressure operation housing 36d, and the heat of the refrigerant vapor from the refrigerant outlet of the evaporator 8 flowing through the second passage 34 is transmitted to the diaphragm drive fluid via the valve member drive rod 36f exposed to the second passage 34 and the pressure equalizing hole 36e, and the diaphragm 36a.

The diaphragm drive fluid within the upper-sectioned pressure operation chamber 36b is gasified in response to the transmitted heat, and the gas pressure thereof is loaded on the upper side of the diaphragm 36a. The diaphragm 36a is moved up and down in response to the difference between the gas pressure and the pressure loaded on the lower side of the diaphragm 36a, and the vertical displacement of the diaphragm is transmitted via the valve member drive rod 36f to the valve member 32b. The flow rate of the refrigerant passing through the valve hole 32a can be controlled via the movement of the valve member 32b moving close to or away from the valve seat of the valve hole 32a.

FIG. 7 is a view showing the expansion valve illustrated in FIG. 6 from the side having the port 321. As shown in FIG. 7, the prior art expansion valve has a valve body 30 comprising a relatively wide body upper portion 60, a relatively narrow body lower portion 61, and a connecting portion 62 in which the width is continuously narrowed from the width of the body upper portion 30 to the width of the body lower portion 61. According to the valve body 30, the bolt holes 63 and 63 are formed by performing a hole forming process such as a drilling process or a cutting process to the area across the body upper portion 60 and the connecting portion 62.

[Patent document 1] Japanese Patent No. 3545847

SUMMARY OF THE INVENTION

The object of the present invention is to provide an expansion valve for controlling the flow rate of a refrigerant by moving the valve member close to or away from a valve seat via transmission of the displacement of a diaphragm constituting a valve member driver provided in a valve body via a valve member drive rod to the valve member, wherein the arrangement of bolt fitting grooves are devised so as to further cut down the amount of material used for the valve body.

In order to solve the problems mentioned above, the present invention provides an expansion valve for transmitting a displacement of a diaphragm constituting a valve member driver provided in a valve body via a valve member drive rod to a valve member, to thereby move the valve member close to or away from the valve seat in order to control a flow rate of a refrigerant; wherein the valve body is composed of a body upper portion, and a body lower portion having a narrower width than the body upper portion, and bolt fitting grooves opened to an outer side of the valve body are formed at a boundary between the body upper portion and the body lower portion.

The expansion valve according to the present invention adopts a layout as described above in which bolt fitting grooves are disposed in the boundary where the width of the valve body is narrowed, according to which the material required to form the boundary can be reduced even further, and as a result, the amount of material required to form the valve body can be reduced furthermore.

BRIEF DESCRIPTION OF THE DRAWINGS

FIG. 2A is a side view of the expansion valve shown in FIG. 1;

FIG. 2B is a rear view of the expansion valve illustrated in FIG. 1;

REFERENCE NUMERALS

| | |
|---|---|
| 20, 20a expansion valve | 21, 21a valve body |
| 40 body upper portion | 41 body lower portion |
| 42 connecting portion | 43, 43 bolt fitting grooves |
| 44 lower end portion | 50 caulking cylinder portion |

BEST MODE FOR CARRYING OUT The INVENTION

Figure 1:
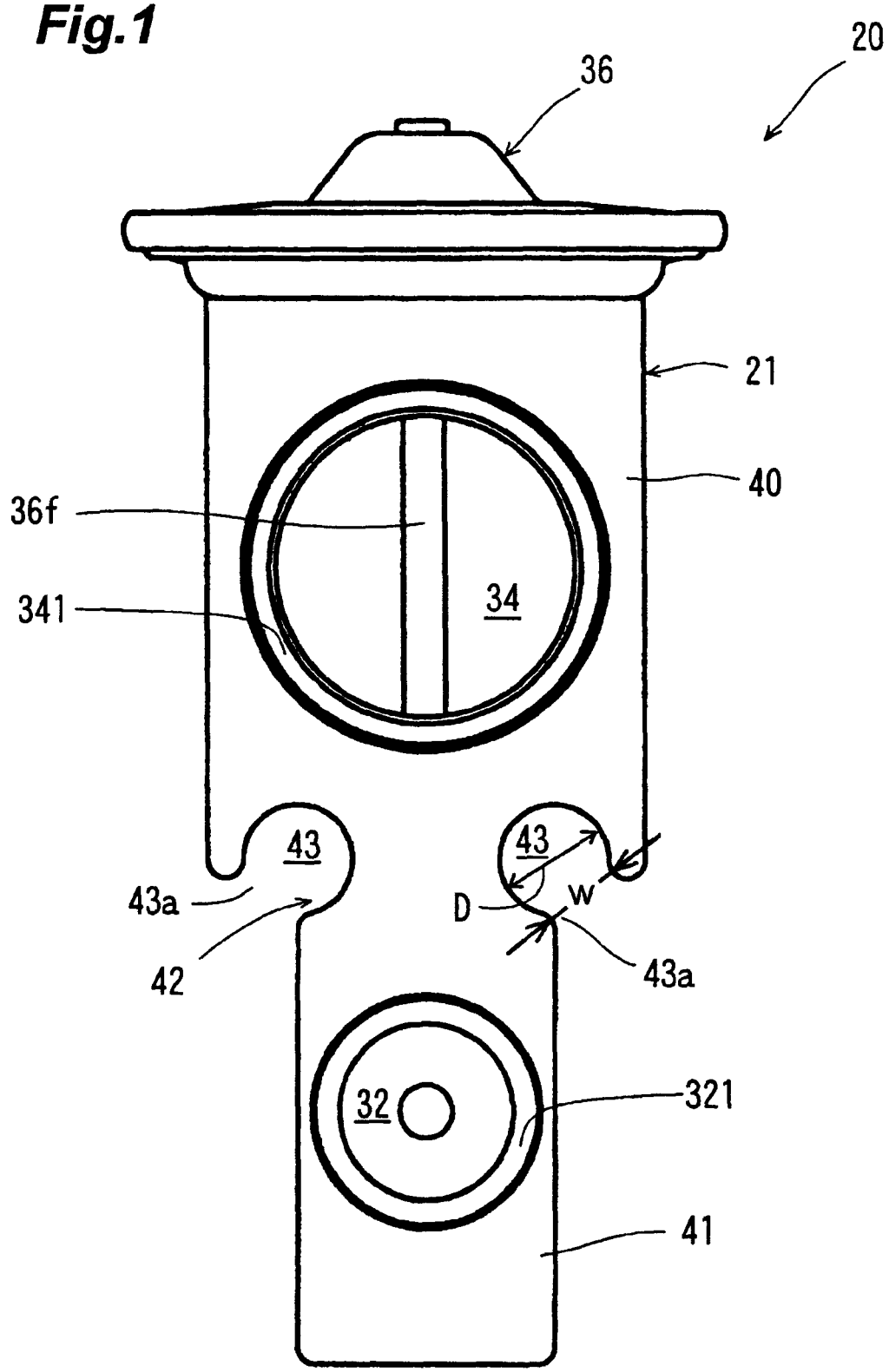
FIG. 1 is a front view showing one embodiment of an expansion valve according to the present invention.
Figure 2C:
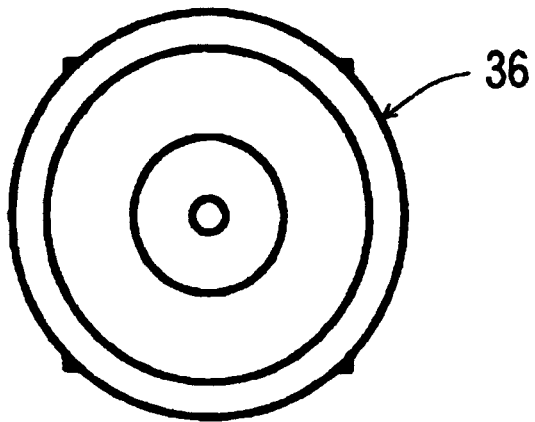
FIG. 2C is an upper view of the expansion valve shown in FIG. 1.
Figure 2D:
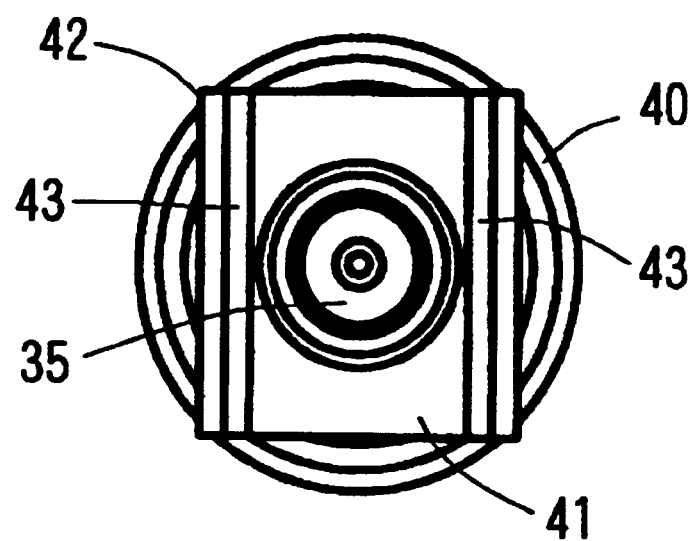
FIG. 2D is a bottom view of the expansion valve shown in FIG. 1.

Now, we will describe the preferred embodiments of an expansion valve according to the present invention with reference to the attached drawings. FIG. 1 is a front view showing one embodiment of the expansion valve according to the present invention. FIG. 2A is aside view of the expansion valve shown in FIG. 1, FIG. 2B is a rear view thereof, FIG. 2C is an upper view thereof, and FIG. 2D is a bottom view thereof.

As shown in FIGS. 1, 2A, 2B, 2C and 2D, the expansion valve 20 comprises a valve body 21 and a valve member driver 36, wherein the valve body 21 is composed of a body upper portion 40 and a body lower portion 41 having a width narrower than the body upper portion 40. The body lower portion 41 of the valve body 20 is formed as a narrowed portion for cutting down the material quantity. Bolt fitting grooves 43 and 43 opened to the outer side of the valve body 21 are formed on left and right sides of the body at a boundary 42 between the body upper portion 40 and the body lower portion 41. The expansion valve 20 has a first passage 32, a second passage 34, the valve member driver 36 and a valve member drive rod 36f visible from the exterior.

Figure 7:
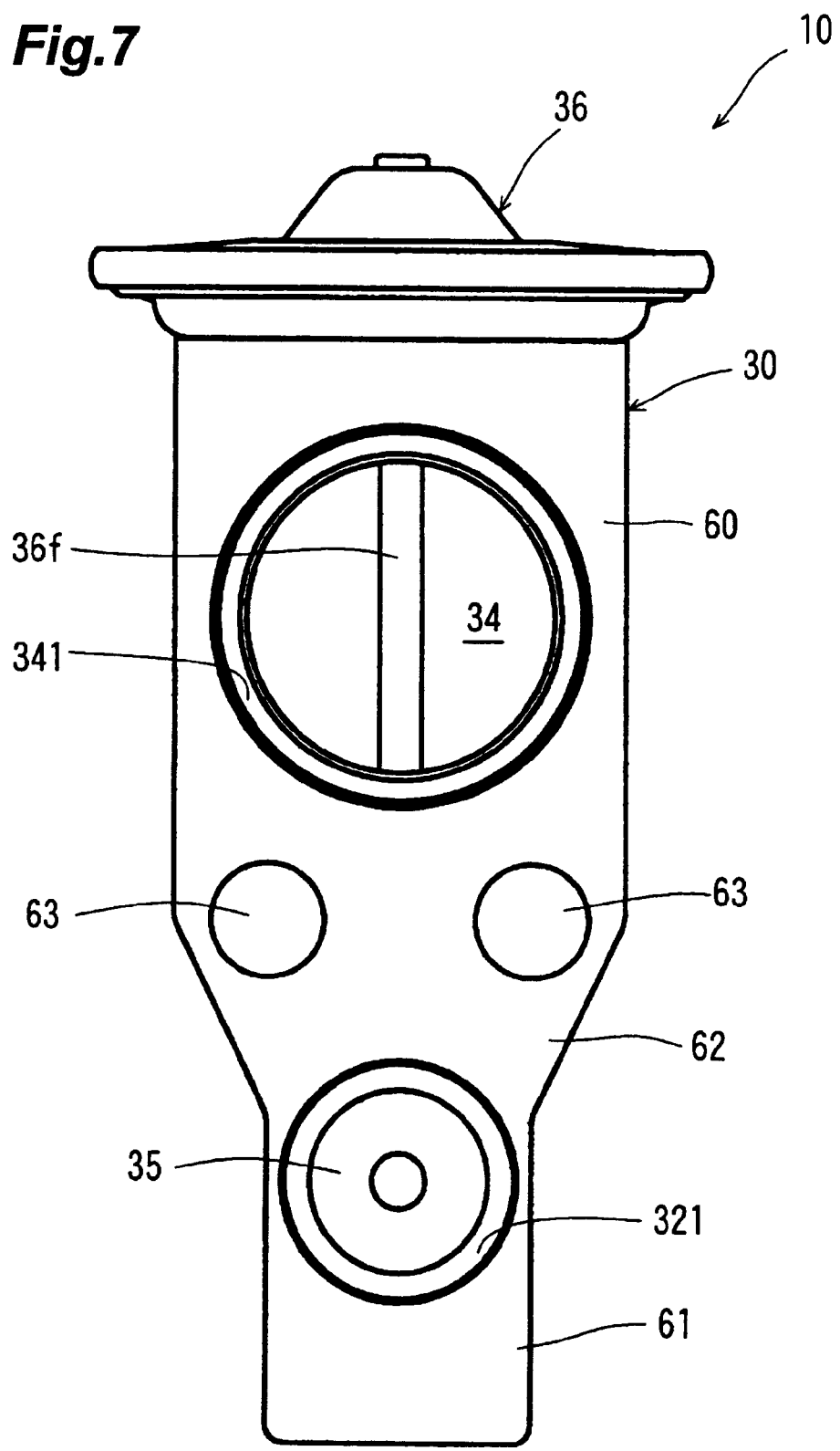
FIG. 7 is a view showing the expansion valve illustrated in FIG. 6 from the inlet port side.

According to the layout of the present embodiment, bolt fitting grooves 43 and 43 are disposed at the boundary 42 where the width of the valve body 20 is varied. Therefore, the body upper portion 40 and the body lower portion 41 are connected through the area constricted by the openings of the bolt fitting grooves 43 and 43, according to which the material required to form the boundary 42 can be further reduced. Furthermore, the height of the body upper portion 40 can be suppressed compared to the case where the bolt fitting grooves 43 and 43 are disposed on the sides in the middle of the body upper portion 40. Furthermore, the body lower portion 41 is made longer than the body lower portion 61 of the prior art expansion valve illustrated in FIG. 7. Based on these shapes and structures, the material required to form the valve body 21 can be reduced even further.

The valve body 21 is formed via extrusion processing in which the aluminum alloy is extruded in the front-rear direction within a mold. Bolt fitting grooves 43 and 43 are formed simultaneously when the valve body 21 is formed via extrusion processing, by providing projections corresponding to the respective bolt fitting grooves 43 to the extrusion processing mold. Since the bolt fitting grooves 43 and 43 can be formed without performing a dedicated processing step such as a drilling process, so the machining operation can be simplified and the processing costs can be cut down.

The bolt fitting grooves 43 and 43 have circular cross-sections, and the openings 43a and 43a of the grooves are opened obliquely downward at the boundary 42. According to this design, round-deformation of the material around the bolt fitting grooves 43 during extrusion processing of the material can be minimized, and the workability and the quality of the expansion valve can be improved.

The opening width (minimum spatial dimension) w of each bolt fitting groove 43 is somewhat smaller than the size of the bolt diameter of a mounting bolt (having a width somewhat smaller than the maximum width D of the bolt fitting groove 43) inserted to the bolt fitting groove 43. According to such dimensions, the mounting bolts inserted to the bolt fitting grooves 43 will not drop off to the sides from the bolt fitting grooves 43, and therefore, the expansion valve 20 mounted on a car body or the like can be prevented from falling without fail. Further, since a portion of the body is hung over the surrounding areas of the bolt fitting grooves 43, a sufficiently large bolt seating surface can be ensured, and the valve can be assembled to units in a stable manner.

Figure 3:
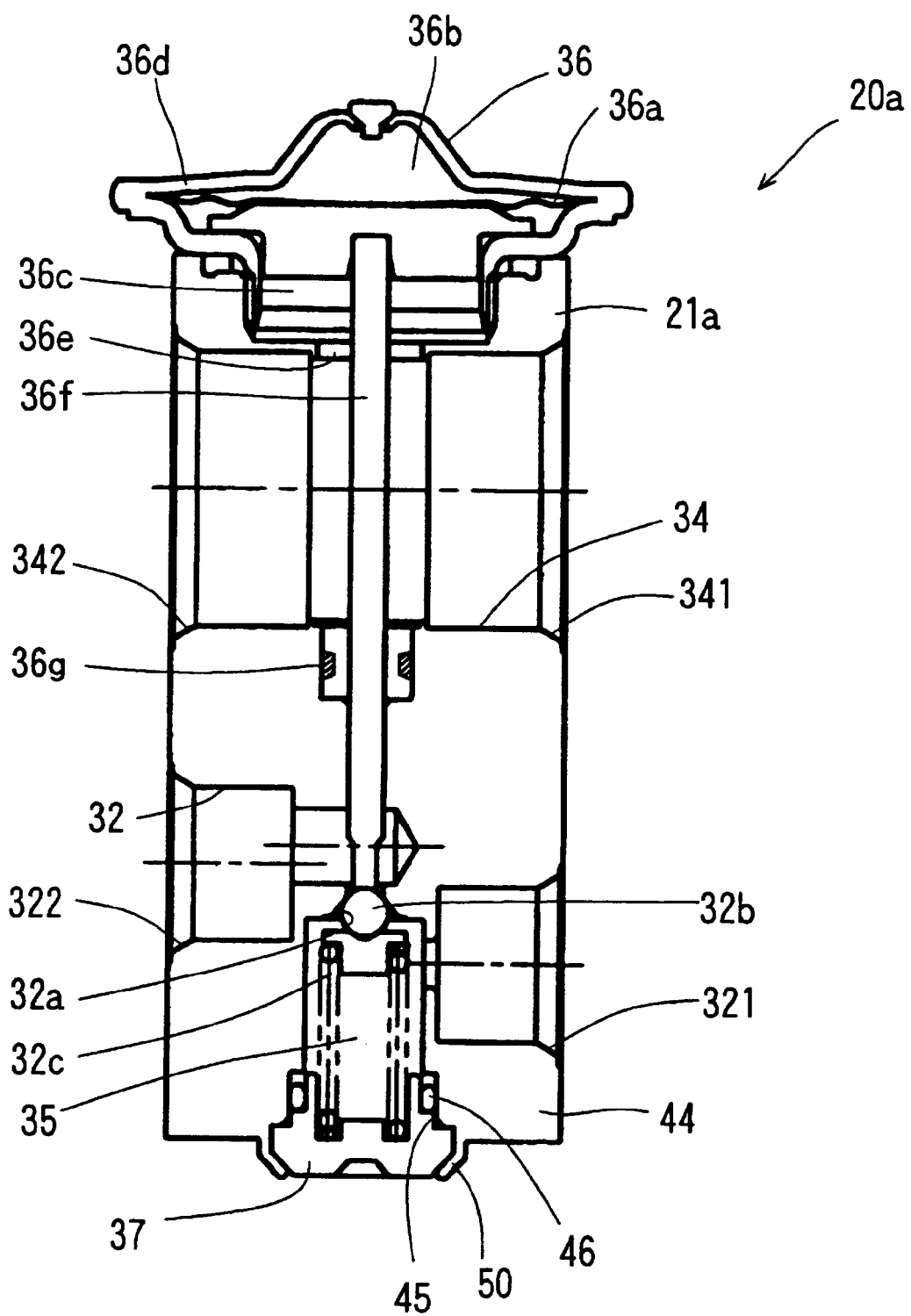
FIG. 3 is a vertical cross-sectional view showing another embodiment of the expansion valve according to the present invention.
Figure 4:
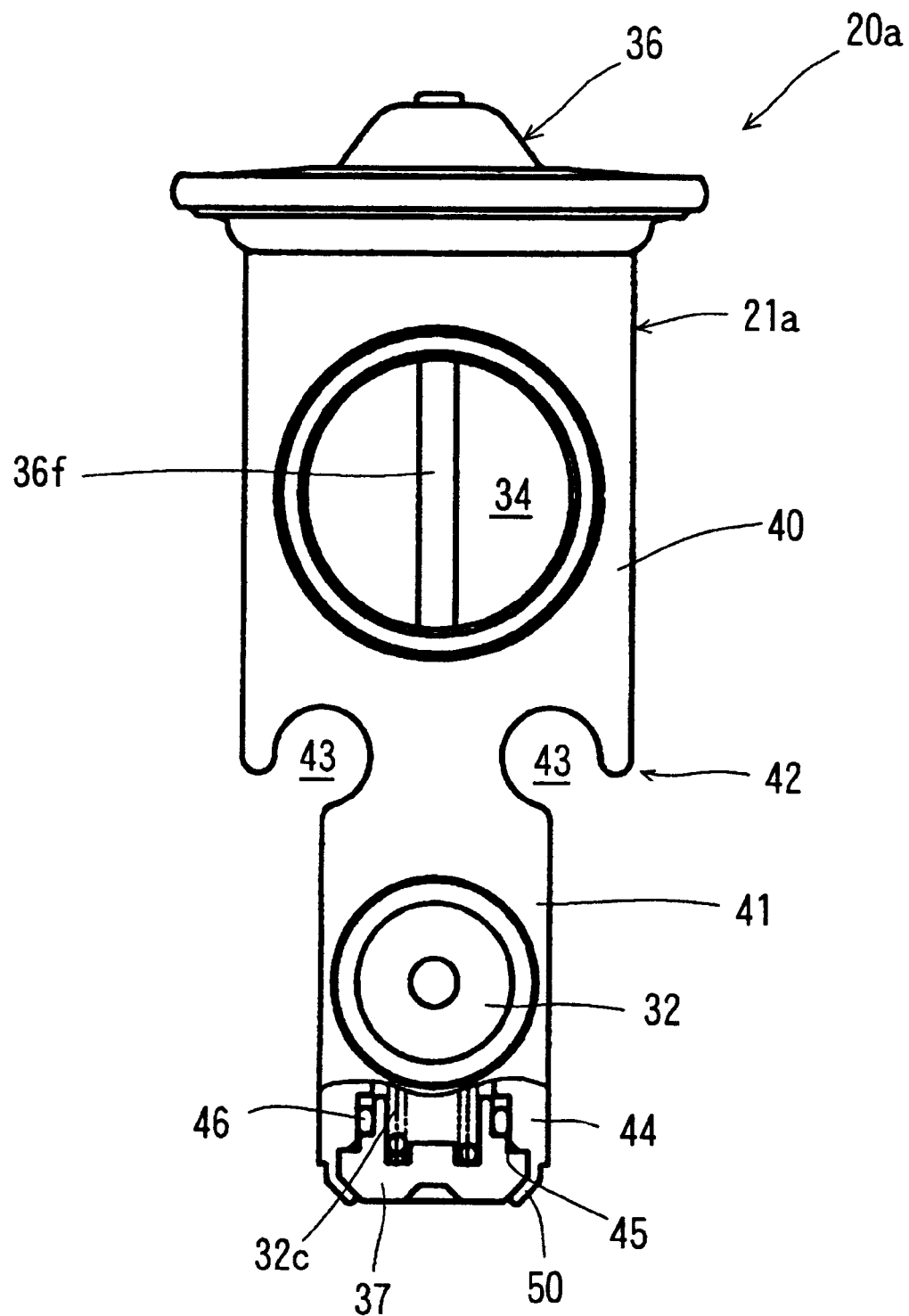
FIG. 4 is a rear view of the expansion valve shown in FIG. 3.
Figure 5:
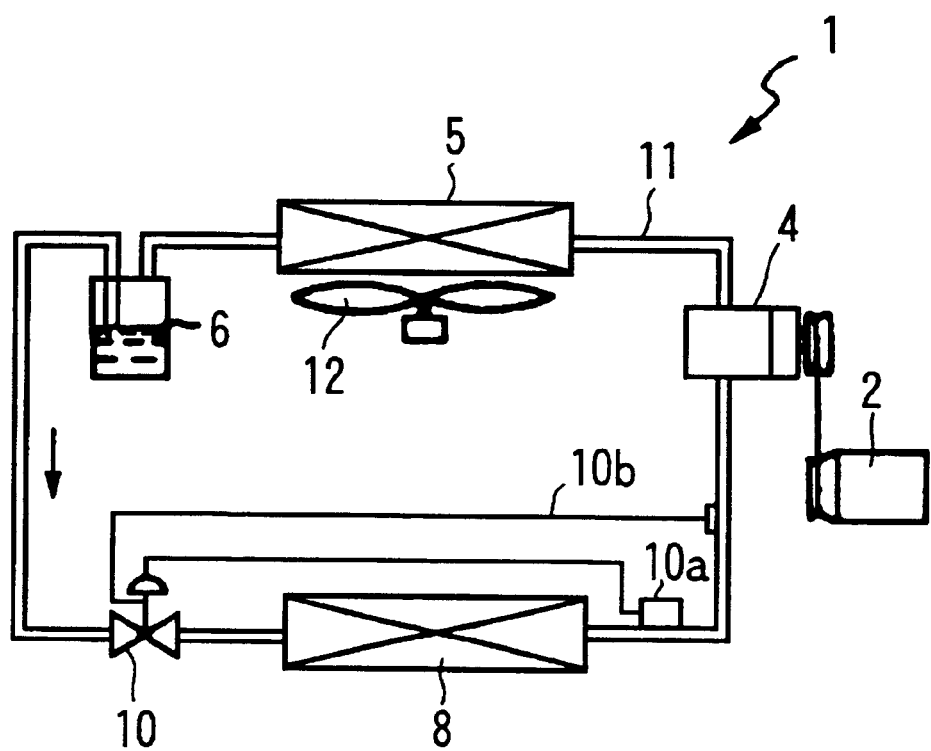
FIG. 5 is a schematic view showing one example of the refrigeration cycle of a prior art air conditioning device.
Figure 6:
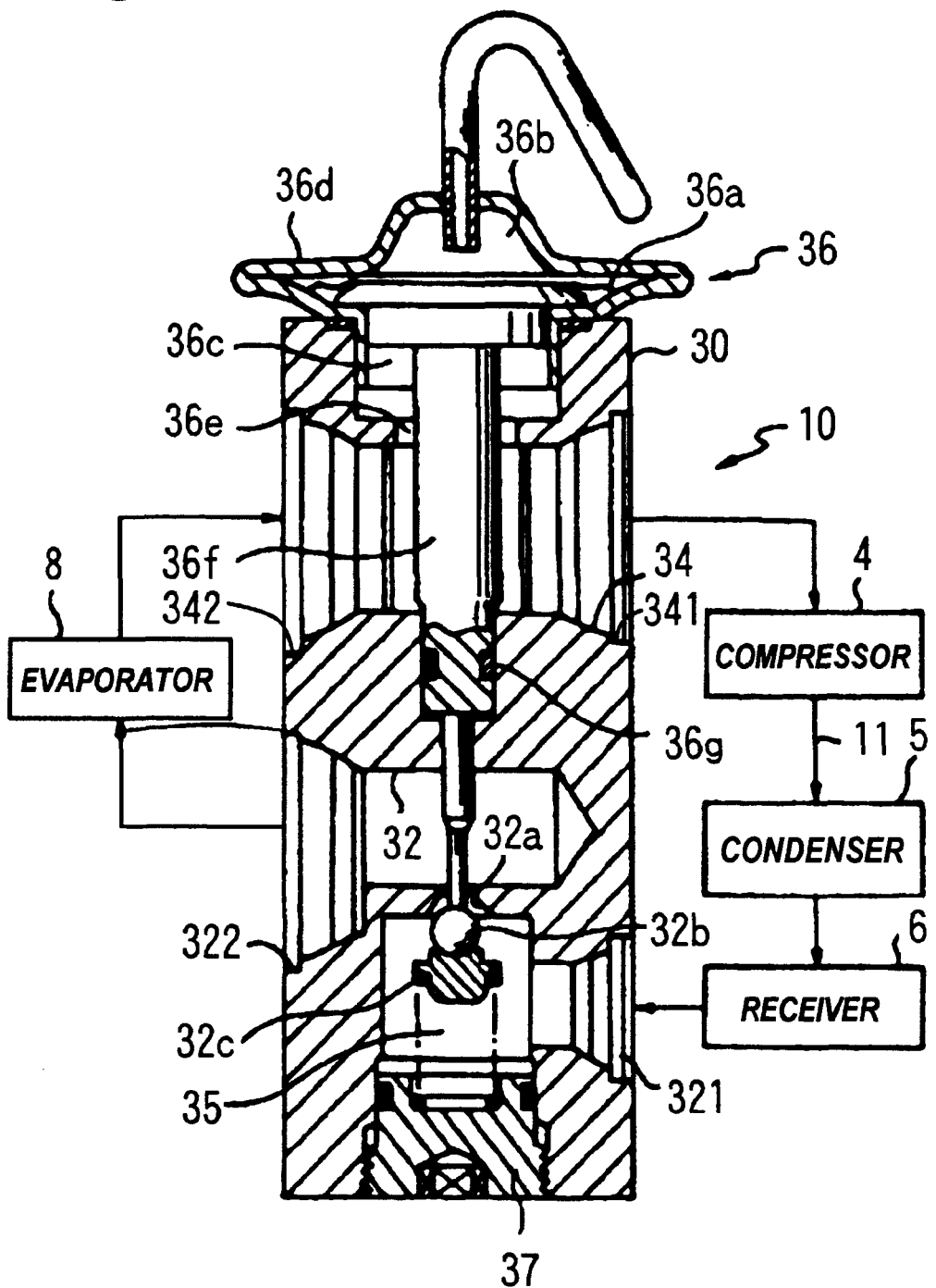
FIG. 6 is a schematic vertical cross-sectional view showing one example of the expansion valve used for the refrigeration cycle shown in FIG. 5.

Another embodiment of the expansion valve according to the present invention will be described with reference to FIGS. 3 and 4. FIG. 3 is a vertical cross-sectional view of another embodiment of the present expansion valve, and FIG. 4 is a rear view thereof. The internal arrangements such as the passages, the valve and the valve member driver of the expansion valve 20a are the same as the arrangements of the prior art expansion valve 10 illustrated in FIG. 6, so the equivalent components are denoted with the same reference numbers as those of FIG. 6, and detailed descriptions thereof are omitted.

According to the valve body 21a of the expansion valve 20a, the arrangements of the body upper portion 40, the body lower portion 41, the connecting portion 42 and the bolt fitting grooves 43 and 43 are the same as those illustrated in FIGS. 1, 2A, 2B, 2C and 2D. In the present embodiment, the body lower portion 41 has a valve chamber 35 communicated with a valve seat (a valve hole 32a), and a fixing hole 45 formed to a lower end portion 44 of the body lower portion 41 and communicated with the valve chamber. The valve chamber 35 is sealed via a plug 37 attached to the fixing hole 45. A sealing member 46 such as an O-ring is disposed between the plug 37 and the fixing hole 45.

Figure 8A:
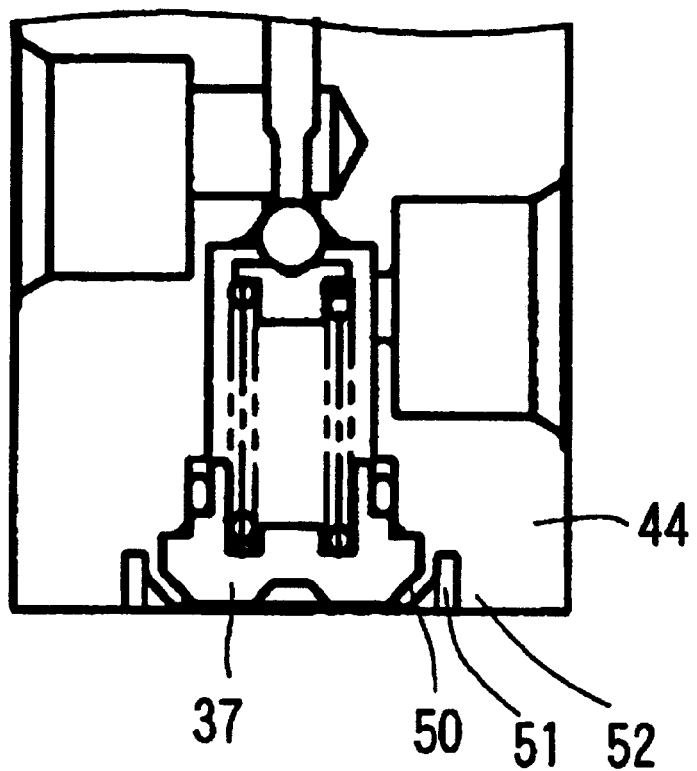
FIG. 8A is a cross-sectional view showing how the plug of the expansion valve is fixed via caulking according to the prior art.
Figure 8B:
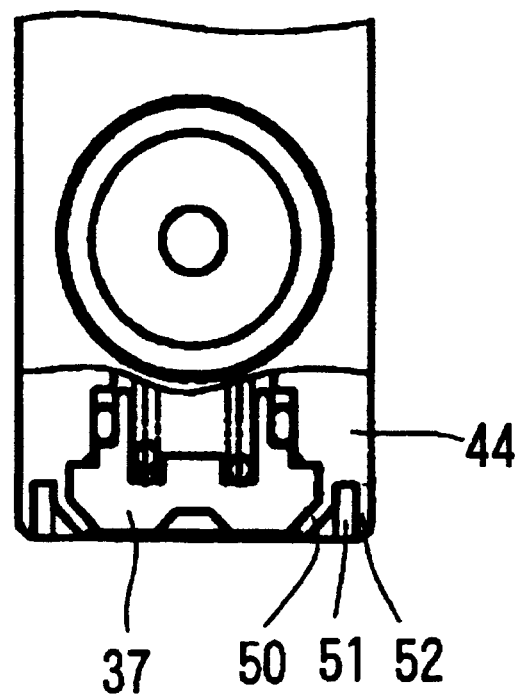
FIG. 8B is a partial cross-sectional view taken from a direction orthogonal to FIG. 8A.

A caulking cylinder portion 50 is formed to the lower end portion 44 by removing the surrounding portion thereof. The plug 37 is fixed to the body lower portion 41 by providing a caulking to the inner side of the caulking cylinder portion 50. FIGS. 8A and 8B illustrate a prior art example of a caulking fixture of the plug 37 to the expansion valve. FIG. 8A is a cross-sectional view, and FIG. 8B is a partial cross-sectional view taken from a direction orthogonal to FIG. 8A. In this prior art, a groove 51 is formed to the outer circumference of the cross-section of the caulking cylinder portion 50, so that an outer step portion 52 of the groove must be formed, and therefore, the width of the main body must be increased in response thereto. In contrast, according to the present embodiment, the material surrounding the caulking cylinder portion 50 is removed via processing to form the caulking cylinder portion 50, so that the width of the main body can be downsized compared to that of the prior art, and the material quantity of the valve body 21a can be cut down even further.

In the above-described embodiments of the present expansion valve, the expansion valves 20 and 20a are mounted to a unit by inserting mounting bolts to the bolt fitting grooves 43 in a position where the valve member driver 36 constituting the power element portion is directed upward, that is, where the body upper portion 40 is disposed on the upper side and the body lower portion 41 is disposed on the lower side. In this mounting arrangement, the openings 43a of the bolt fitting grooves 43 are opened downward. When the valve bodies 21 and 21a of the expansion valve 20 is cooled via the operation of the refrigeration cycle, the moisture attached to the surface of the valve bodies 21 and 21a attempts to flow down on the surface of the body by its own weight. The moisture attached to the bolt fitting grooves 43 or the moisture flown into the bolt fitting grooves 43 will not remain within the bolt fitting grooves 43, and will drip down from the openings 43a, so that the moisture will not cause corrosion of the valve bodies 21 and 21a. In the prior art expansion valve, the area where the mounting bolts are inserted was the bolt fitting holes, and the moisture adhered thereto tends to remain within the bolt fitting holes, but on the other hand, according to the present expansion valve, moisture will not remain in the bolt fitting grooves, and the corrosion-resistant characteristics can thereby be improved.

The invention claimed is:

1. An expansion valve for transmitting a displacement of a diaphragm constituting a valve member driver provided in a valve body via a valve member drive rod to a valve member, to thereby move the valve member close to or away from a valve seat in order to control a flow rate of a refrigerant; wherein the valve body is composed of a body upper portion, and a body lower portion having a narrower width than the body upper portion, and bolt fitting grooves opened to an outer side of the valve body are formed at a boundary between the body upper portion and the body lower portion.

the bolt fitting grooves are formed simultaneously during extrusion processing of the valve body, the bolt fitting grooves have cylindrical arc-shaped cross-sections, and the openings of the grooves are opened toward an obliquely downward direction at the boundary, and the opening width of the bolt fitting grooves is narrower than a bolt diameter of a mounting bolt inserted into the bolt fitting grooves.

* * * * *